METALLIC STRIP MILLING MACHINE

Original Filed May 31, 1968 7 Sheets-Sheet 1

Inventors
Stanley R. Hood
Robert H. Truyitt
By: Wallenstein, Spangenberg, Hallis & Strampel

METALLIC STRIP MILLING MACHINE

Original Filed May 31, 1968 7 Sheets-Sheet 2

Inventors
Stanley R. Hood
Robert E. Truitt
By: Wallenstein, Spangenberg, Hattis & Strampel

METALLIC STRIP MILLING MACHINE

Original Filed May 31, 1968 7 Sheets-Sheet 3

Inventors
Stanley R. Hood
Robert H. Truitt
By: Wallenstein, Spangenberg, Hattis & Strampel
Attys

METALLIC STRIP MILLING MACHINE

Original Filed May 31, 1968 7 Sheets-Sheet 4

Inventors
Stanley R. Hood
Robert E. Truitt
By: Wallenstein, Spangenberg, Hattis & Strampel Attys

METALLIC STRIP MILLING MACHINE

Original Filed May 31, 1968 7 Sheets-Sheet 5

Inventors
Stanley R. Hood
Robert E. Truitt
By: Wallenstein, Spangenberg, Hattis & Strampel Attys.

METALLIC STRIP MILLING MACHINE

Original Filed May 31, 1968 7 Sheets-Sheet 6

Inventors
Stanley R. Hood
Robert E. Truitt
By: Wallenstein, Spangenberg, Hattis & Strampel Attys.

METALLIC STRIP MILLING MACHINE
Original Filed May 31, 1968 7 Sheets-Sheet 7
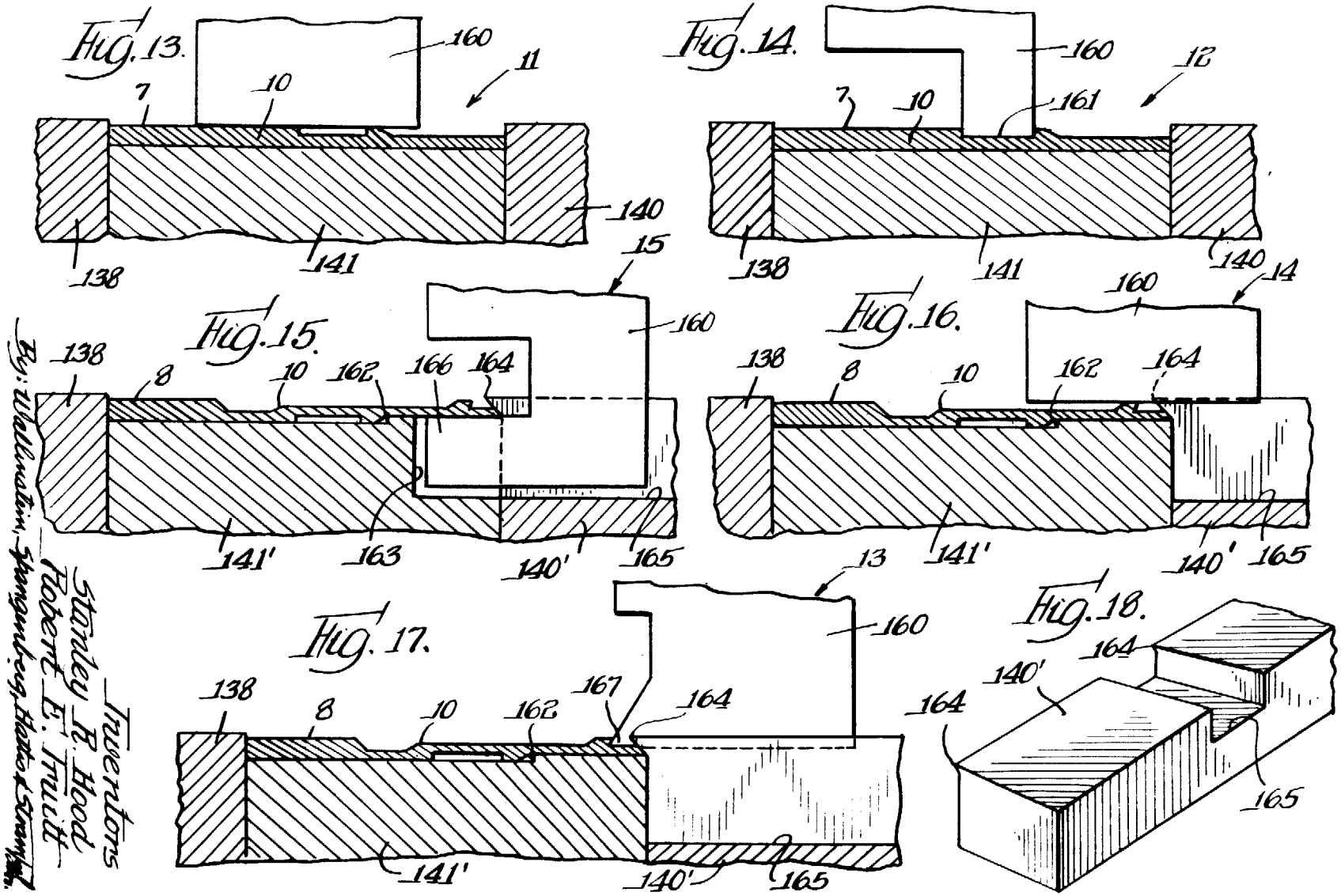

United States Patent Office

Re. 27,664
Reissued June 12, 1973

27,664

METALLIC STRIP MILLING MACHINE

Stanley R. Hood, La Jolla, Calif., and Robert E. Truitt, Reading, Pa., assignors to Metals Engineering Company, Reading, Pa.

Original No. 3,494,253, dated Feb. 10, 1970, Ser. No. 733,579, May 31, 1968. Application for reissue Feb. 22, 1971, Ser. No. 109,067

Int. Cl. B23c *3/00, 9/00*

U.S. Cl. 90—21 11 Claims

Matter enclosed in heavy brackets [ ] appears in the original patent but forms no part of this reissue specification; matter printed in italics indicates the additions made by reissue.

ABSTRACT OF THE DISCLOSURE

A milling machine is provided for simultaneously milling contours in opposite sides of a metallic strip, wherein the metallic strip is fed from a supply reel at one end of the machine in one path lengthwise along the machine and is reversed upside down by a reversing roll at the other end of the machine and fed in another adjacent path lengthwise along the machine to a take-up reel at said one end of the machine. At least one milling unit is provided toward said one end of the machine for milling the upwardly facing side of the metallic strip in said one path, and at least one other milling unit is provided toward said other end of the machine for milling the upwardly facing side of the metallic strip in said other adjacent path. An inspection station including a comparator is located adjacent the center of the machine for inspecting the upwardly facing milled sides of the metallic strip passing thereby in said paths.

A principal object of this invention is to provide a milling machine for simultaneously milling contours in opposite sides of a metallic strip, the machine being as described above. By so simultaneously milling contours in opposite sides of the metallic strip, more accurate milling is made possible, less handling of material is required and general operating costs and expenses are maintained at a minimum.

Preferably, the machine also includes deburring fixtures adjacent the milling units for removing burrs which may be formed by the milling operations. Also, suitable driving means for driving the metallic strip through the machine and suitable controls therefor are provided to assure accurate feeding of the metallic strip through the milling units and deburring fixtures. The milling units and deburring fixtures are adjustable in construction and operation for accommodating differently dimensioned metallic strips and milling differently dimensioned contours therein.

Such metallic strips with contours accurately milled on opposite sides may be readily fed to progressive dies in a suitable press for forming various different parts, such as, for example, keys electrical connectors, spring contacts and the like.

Further objects of this invention reside in the details of construction of the milling machine and in the cooperative relationships between the component parts thereof.

Other objects and advantages of this invention will become apparent to those skilled in the art upon reference to the accompanying specification, claims and drawings in which:

Figure 4:
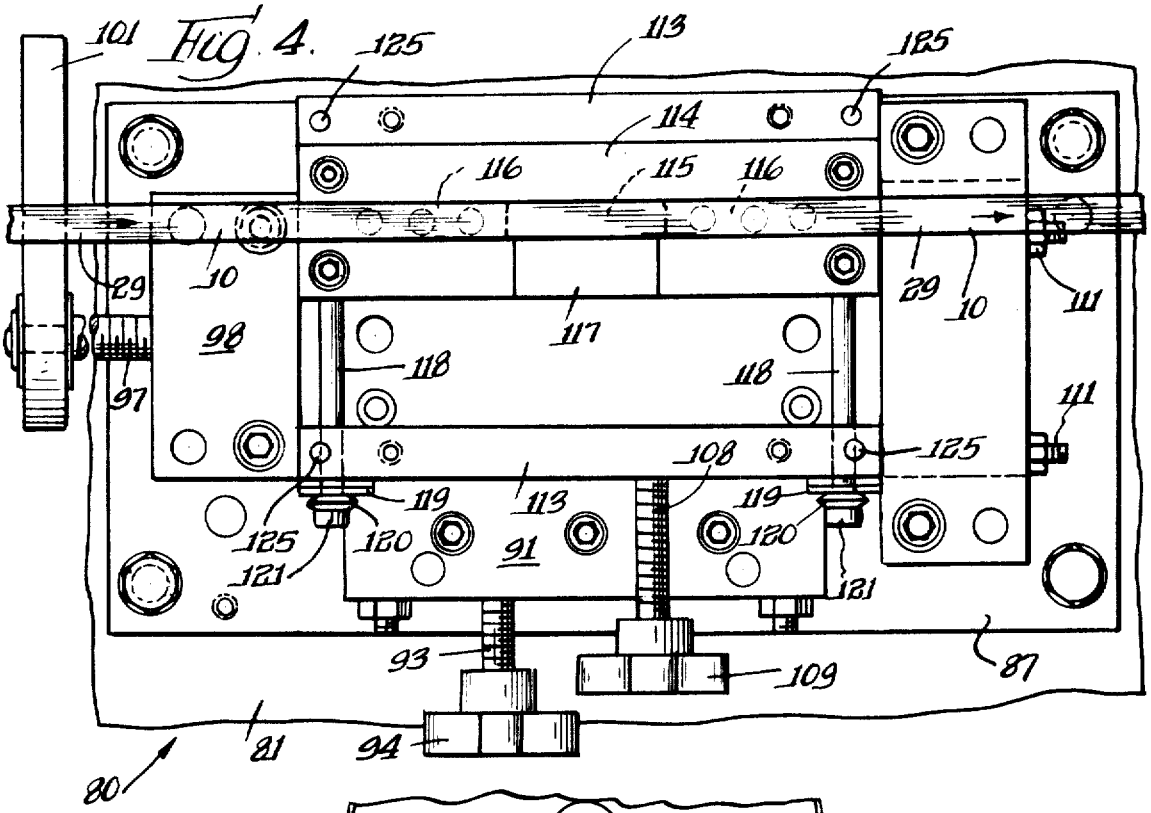
Figure 5:
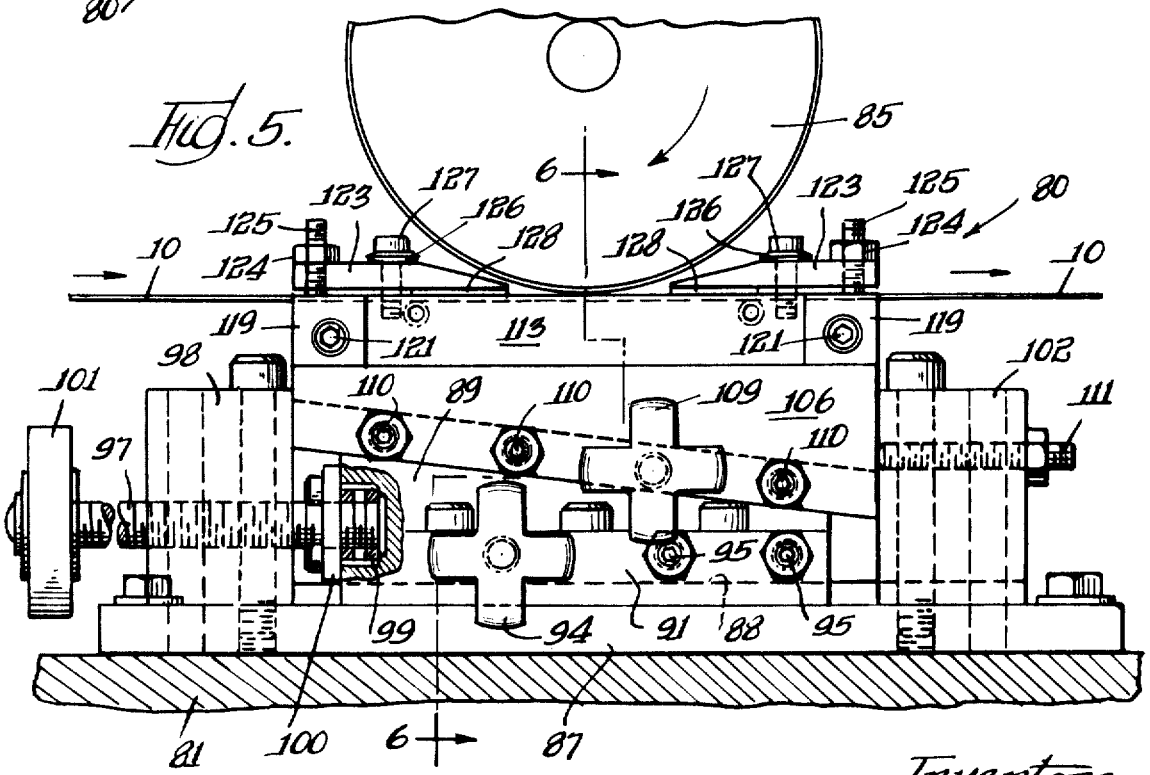
Figure 6:
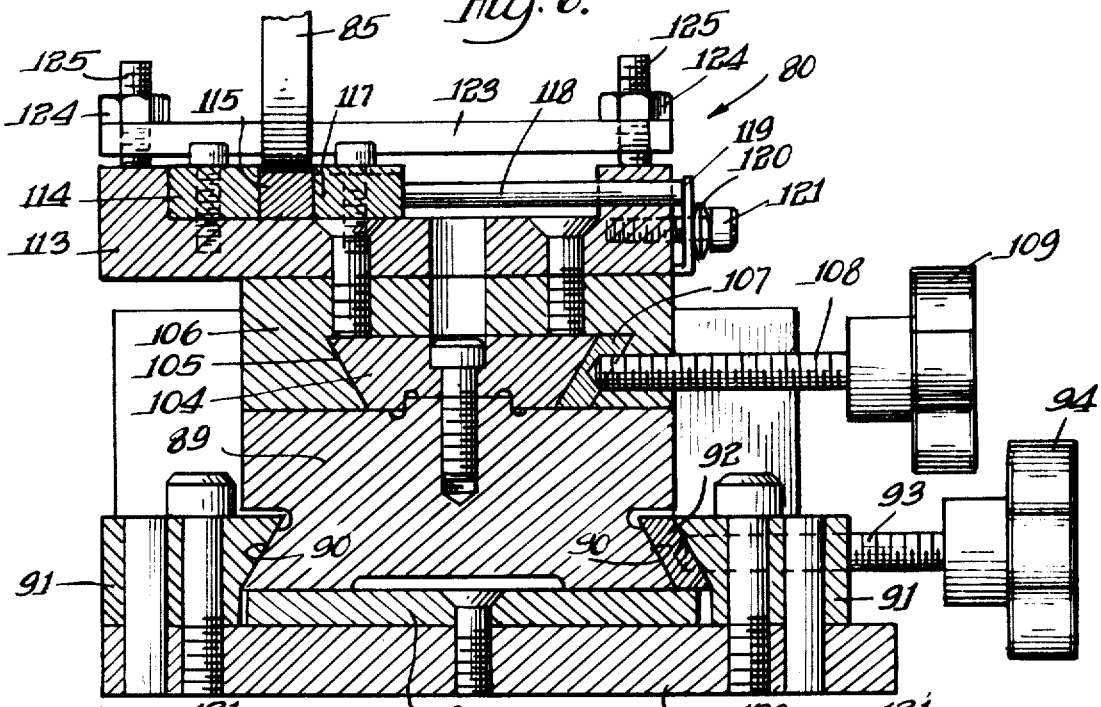
Figure 7:
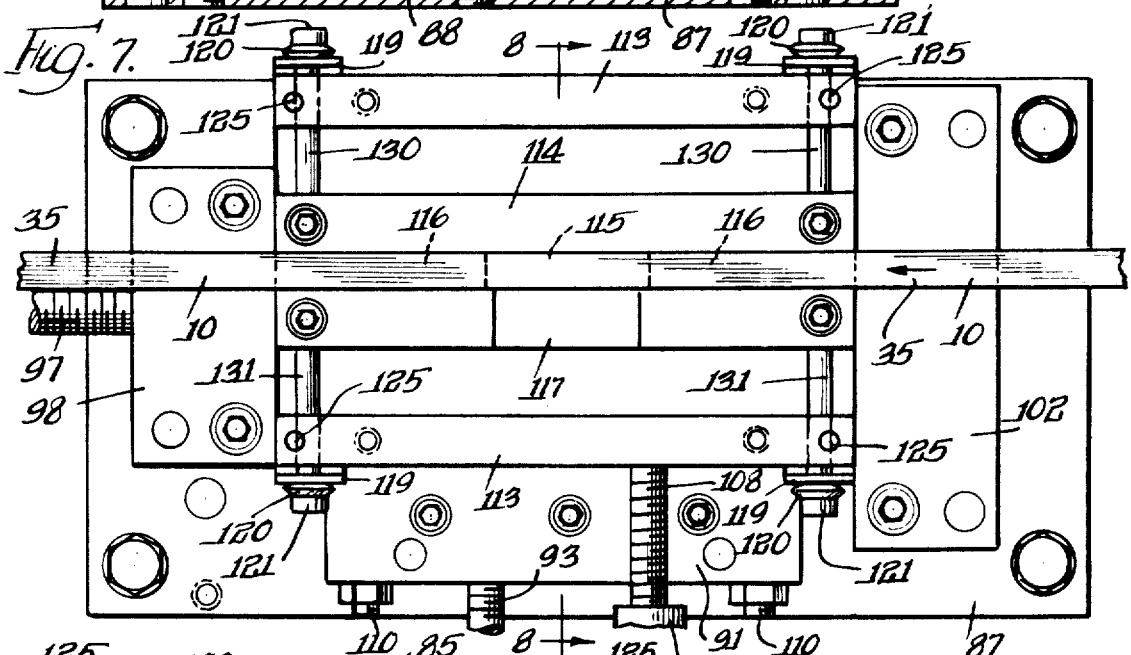
Figure 8:
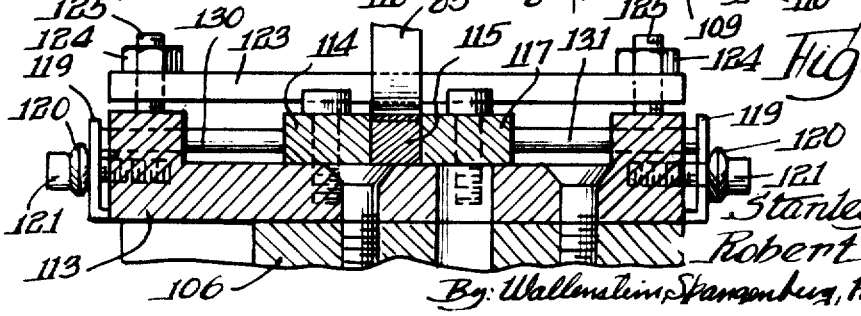
Figure 9:
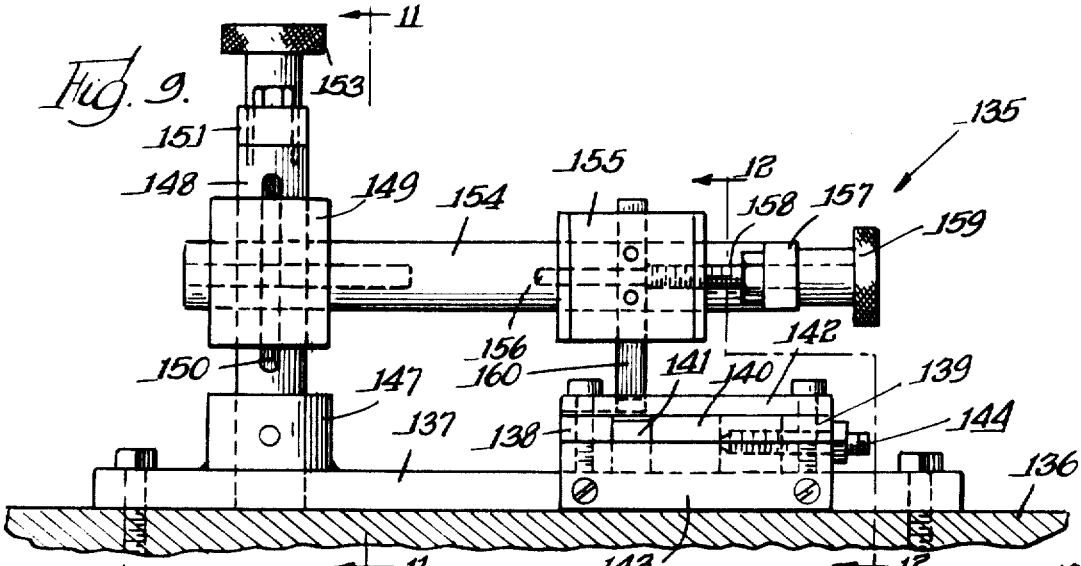
Figure 10:
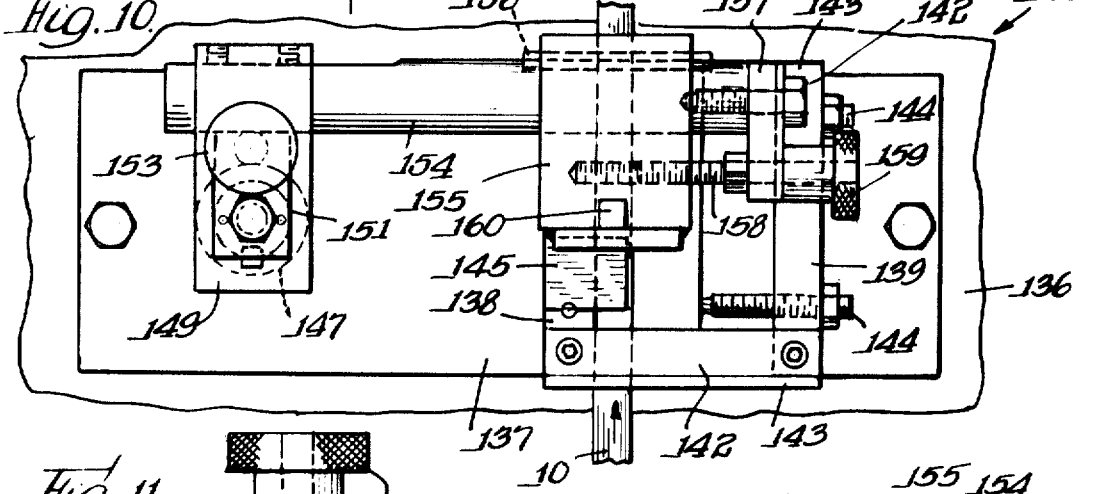
Figure 11:
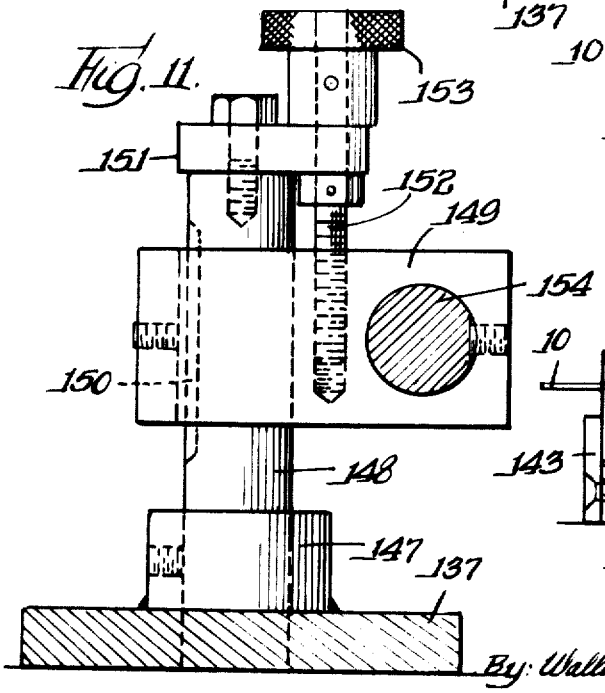
Figure 12:
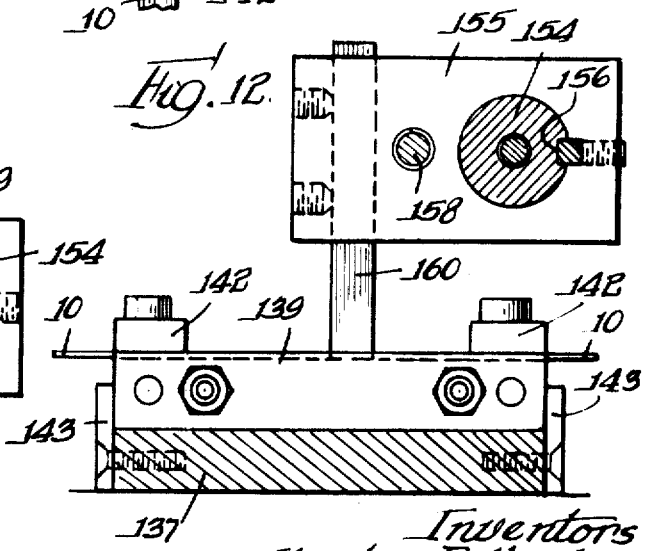

When FIGS. 2 and 3, 2A and 3B and 2B and 3B are layed end to end, they illustrate diagrammatically the milling machine of this invention;

FIG. 4 is a top plan view of the adjustable support utilized in the milling units which perform the milling operation in said one path with portions of the milling units omitted;

FIG. 5 s a side elevational view of the adjustable support illustrated in FIG. 4;

FIG. 6 is a vertical sectional view through the adjustable support taken substantially along the line 6—6 of FIG. 5;

FIG. 7 is a top plan view similar to FIG. 4 but illustrating the adjustable support for performing milling operations in said other adjacent path;

FIG. 8 is a sectional view through a portion of the adjustable support of FIG. 7, FIG. 8 being taken substantially along the line 8—8 of FIG. 7;

FIG. 9 is an elevational view of one of the deburring fixtures;

FIG. 10 is a top plan view of the deburring fixture illustrated in FIG. 9;

FIG. 11 is a vertical sectional view taken substantially along the line 11—11 of FIG. 9;

FIG. 12 is a vertical sectional view taken substantially along the line 12—12 of FIG. 9;

FIG. 13, 14, 15, 16 and 17 are enlarged views illustrating certain details of the various deburring fixtures utilized in the machine; and FIG. 18 is a partial perspective view of the guide plate utilized in the arrangements of FIGS. 15, 16 and 17.

Figures 1, 2, 3:
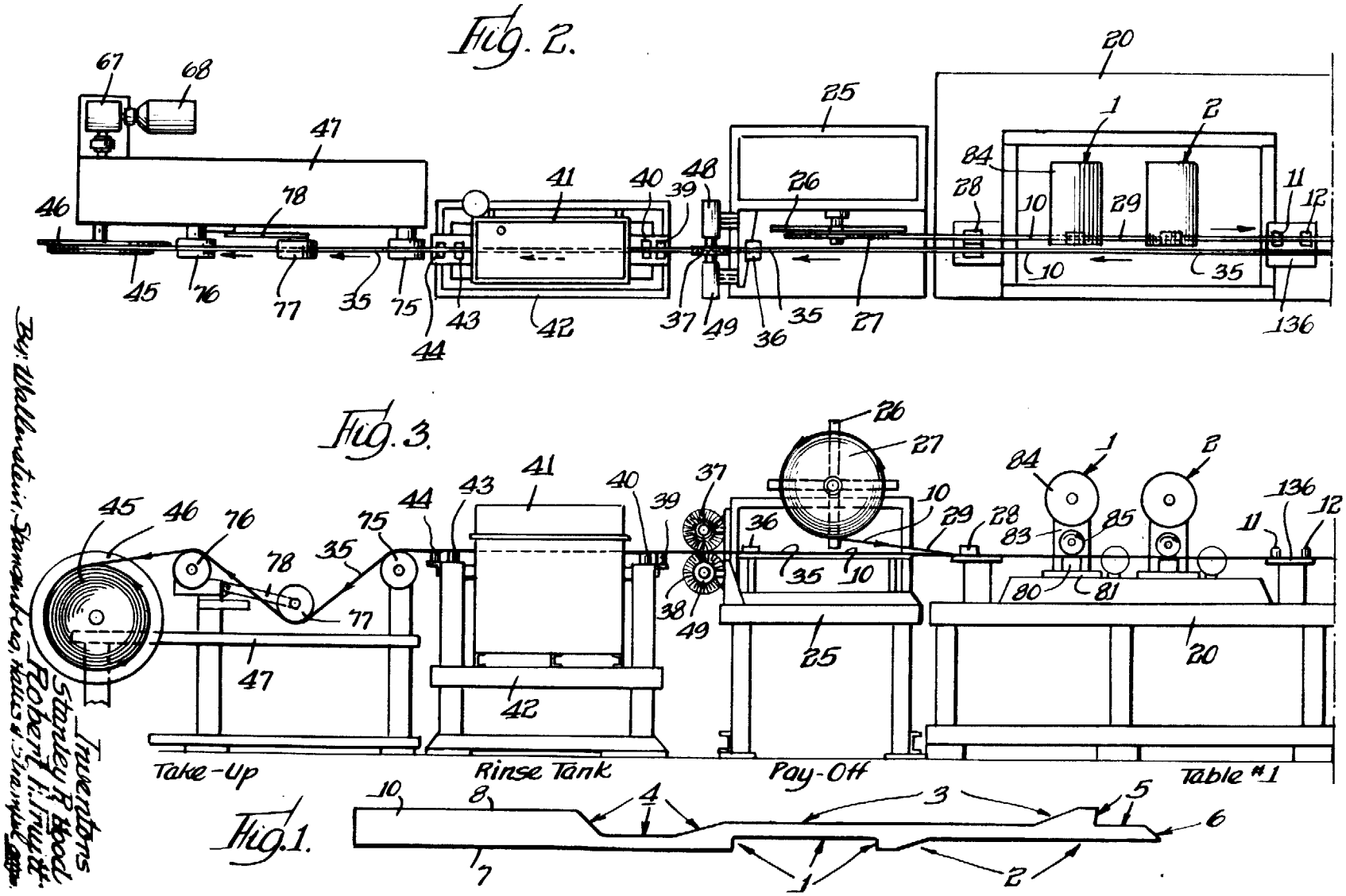
FIG. 1 is an enlarged cross sectional view of a metallic strip which has had contours milled on opposite sides thereof by the milling machine of this invention.
FIGS. 2 and 3 are top plan and side elevational views of one end of the milling machine of this invention.

Referring now to FIG. 1, there is illustrated on an enlarged scale a metallic strip 10 having opposite sides 7 and 8. For example, this metallic strip 10 may have a thickness of 0.18 inch and a width of .370 inch. In the milling of the strip 10 by the milling machine of this invention the side 7 of the strip 10 faces upwardly and as the strip is moved along said one path lengthwise of the machine, a milling unit 2 mills the contour 1 and then a milling unit 2 mills the contour 2. The strip 10 with the contours 1 and 2 milled therein is then reversed at the other end of the machine so as to place the side 8 upwardly. The strip then is advanced with the side 8 facing upwardly along said other adjacent path along the machine and a milling unit 3 then mills the contour 3, a milling unit 4 mills the contour 4, milling unit 5 mills the contour 5 and a milling unit 6 mills the contour 6. The metallic strip 10 with the milled contours 1, 2, 3, 4, 5 and 6 is utilized by way of example to show the complete versatility of the milling machine of this invention.

The milling units 1 and 2 for milling the contours 1 and 2 on the side 7 of the metallic strip 10 are diagrammatically shown in FIGS. 2 and 3 and are generally designated 1 and 2. These milling units 1 and 2 are carried by a table 20 identified as table #1 and this table also carries deburring fixtures 11 and 12 for removing burrs resulting from the operation of the milling units 1 and 2. The milling units 3, 4, 5 and 6 for forming the contours on the opposite side 8 of the metallic strip 10 are diagrammatically illustrated in FIGS. 2B and 3B, these milling units being generally designated as 3, 4, 5 and 6. These milling units are carried by a table 21 which has been designated table #1 and this table 21 also carries deburring fixtures 13, 14 and 15 for removing burrs on side 8 of the strip 10 following milling thereof.

Figure 2A:
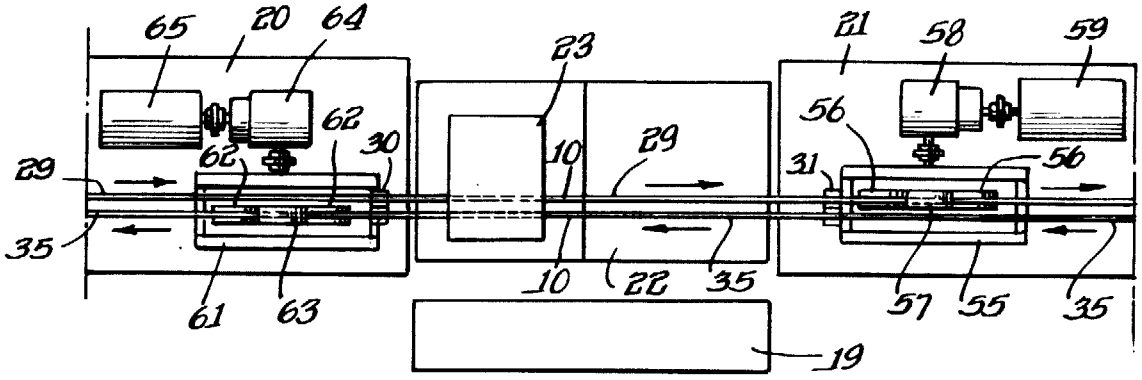
FIGS. 2A and 3A are top plan and side elevational views of the center of the machine.
Figure 3A:
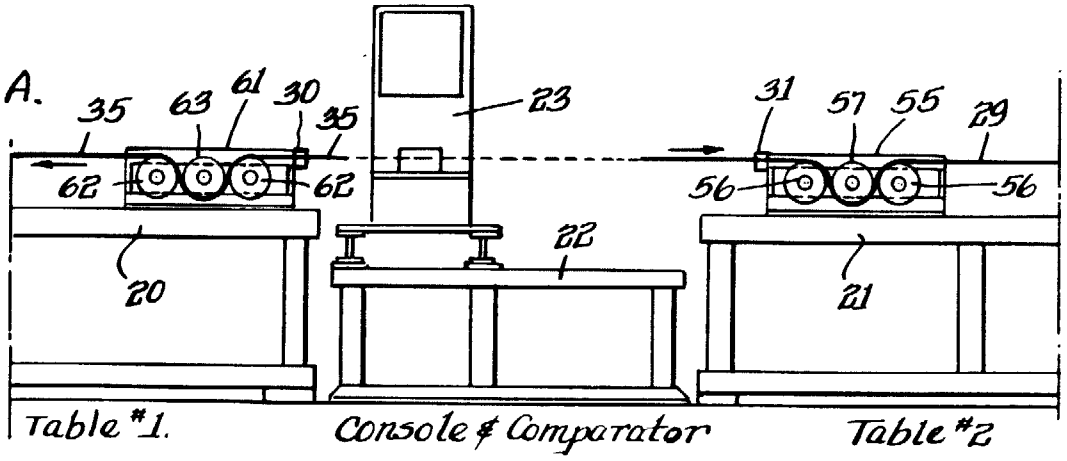

Interposed between tables 20 and 21 is a console and comparator station as shown in FIGS. 2A and 3A. This station includes a control console 19 and a support 22 for a comparator 23.

Adjacent one end of the machine as illustrated in FIGS. 2 and 3 there is provided a pay-off station which includes a support 25 for supporting a reel 26 carrying a coil 27 of the metallic strip 10. The reel 26 is provided with a friction brake so as to provide tension in the metallic strip 10 as it is uncoiled or payed-off from the coil 27.

Figure 2B:
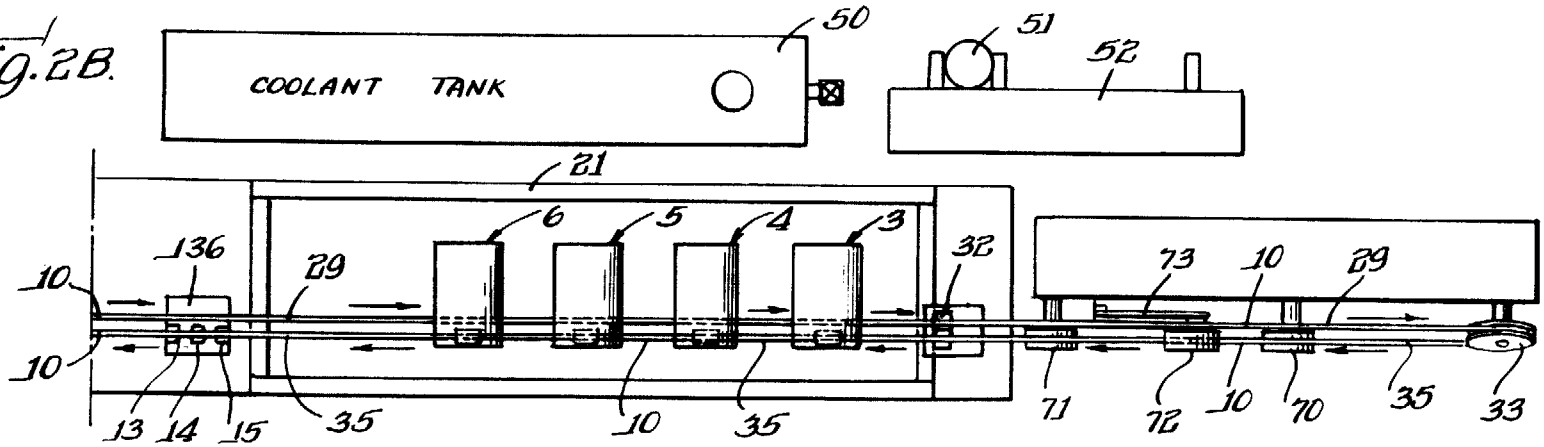
FIGS. 2B and 3B are top plan and side elevational views of the other end of the machine.
Figure 3B:
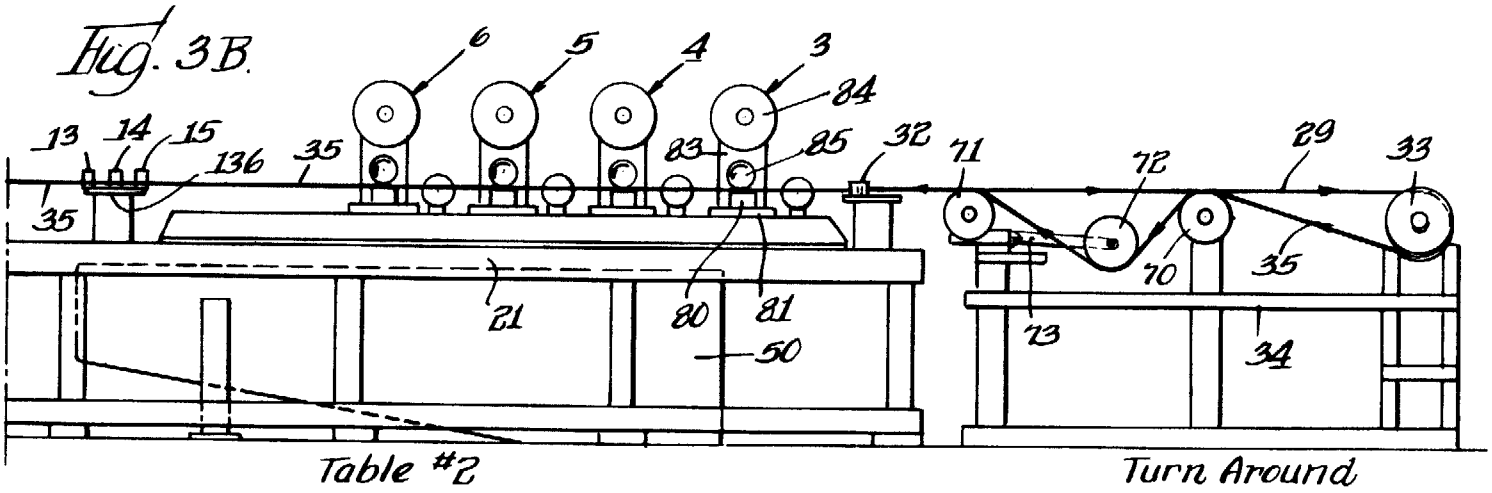

As the metallic strip 10 is payed-off from the coil 27, it passes through a guide 28 along a path 29 extending lengthwise from said one end of the machine. The metallic strip 10 is passing along said on path 29 is then milled by the milling units 1 and 2 and deburred by the deburring fixtures 11 and 12 as illustrated in FIGS. 2 and 3. The metallic strip 10 moving along said one path 29 passes through a guide 30 and through comparator 23 so that it may be accurately inspected following the milling and deburring operations performed by the milling units 1 and 2 and the deburring fixtures 11 and 12 as shown in FIGS. 2A and 3A. The metallic strip 10 proceeds from the comparator 23 through a guide 31 and a guide 32, as shown in FIGS. 2B and 3B to a reversing roll 33 where the metallic strip is reversed or turned around so that the side 8 of the metallic strip is then caused to face upwardly. The reversing roll 33 is carried by a frame 34 of a turn around station and the reversed metallic strip 10 then proceeds from this end of the machine back to the other end of the machine along said other adjacent path 35. To assist in laterally locationg the path 35 from the path 29 the reversing roll 23 is preferably canted as illustrated in FIG. 2B and 3B.

The metallic strip 10 with its side 8 upwardly moving along said other adjacent path 35 passes through a guide 32 and through the milling units 3, 4, 5 and 6 where the contours 3, 4, 5 and 6 are milled into the side 8 of the metallic strip 10. The metallic strip 10 then passes through deburring fixtures 15, 14 and 13 for removing burrs caused by the milling units in forming the contours. As shown in FIGS. 2A and 3A, the metallic strip 10 in said path 35 passes through a guide 31 and through the comparator 23 to a guide 30. The comparator provides for accurate inspection of the milling and deburring operations performed on the side 8 of the metallic strip 10 at the same time that inspection may be made of the milled and deburred contours on the side 7 of the metallic strip. Thus, complete and accurate and simultaneous inspection of both sides of the metallic strip may be performed. The metallic strip 10 in the path 35 after leaving the guide 30 passes through a guide 36 as shown in FIGS. 2 and 3 and between brushes 37 and 38 operated by motors 48 and 49 for brushing both sides of the metallic strip 10 to remove any particles which may be adhering thereto. From the brushes 37 and 38 the metallic strip moving along the path 35 feeds through a guide 39, a wiper 40, a rinse tank 41 carried by a frame 42, a wiper 43 and a guide 44 to a take-up reel 46 arranged on a frame 47 of a take-up station. The reel 46 coils the completely contoured and cleaned metallic strip thereon in a coil 45. As shown in FIGS. 2B and 3B, the machine may also be provided with a coolant tank 50, a filter 51 and suitable piping carried by a frame 52 for supplying coolant to the milling units 1, 2, 3, 4, 5 and 6.

The metallic strip 10 is fed along the path 28 from the pay-off reel 26 past the milling units 1 and 2, the deburring units 11 and 12 and the comparator 23 by a driving means 55 illustrated in FIGS. 2A and 3A. The driving means 55 includes a pair of free running pressure rolls 56 and a driven roll 57 operated through a variable speed drive mechanism 58 by an electric motor 59, the metallic strip 10 coursing the rolls 56 and 57. Thus, a positive and accurately controlled feeding of the metallic strip 10 along the path 29 is provided. A control means is included at the console 19 adjacent the comparator 23 for controlling the variable speed drive 58 to regulate the speed of advance of the metallic strip 10. Thus, by inspection of the metallic strip at the comparator 23 the operator at the console can accurately regulate the speed of advance of the metallic strip 10 in accordance with conditions prevailing at the comparator.

The metallic strip 10 is fed along the path 35 through the milling units 3, 4, 5 and 6, the deburring units 15, 14 and 13 and the comparator 23 by a drive means 61 on table 20 as illustrated in FIGS. 2A and 3A. This drive means 61 also includes a pair of pressure rolls 62 and a driven roll 63 which are coursed by the metallic strip 10 in the path 35, the driven roll 63 being driven through a variable speed drive 64 by an electric motor 65. The speed of operation of the driving means 61 is controlled so as to provide a desired tension in the metallic strip 10 as it passes along the path 35. Towards this end, the turn around station 34 which carries the reversing roll 33 is provided with a pair of rolls 70 and 71 over which the metallic strip 10 passes in the path 35. A roll 72 carried by an arm 73 rides on the top of the metallic strip 10 between the rolls 70 and 71 and it moves upwardly and downwardly depending upon the tension in the metallic tape. The arm 73 carrying the rolls 72 operates a control device which in turn regulates the variable speed drive 64 for controlling the speed of operation of the driving means 61 and, hence, the tension in the metallic strip.

The take-up reel 46 is operated through a variable speed drive 67 by an electric motor 68 and it is controlled by a tension responsive device at the take-up station 47 for providing proper tension in the metallic strip 10 as it is being coiled on the reel 46. In this connection, the metallic strip 10 in the path 35 passes over rolls 75 and 76 and a roll 77 carried by an arm 78 rides on the upper surface of the metallic strip 10 between the rolls 75 and 76. The roll 77 will move upwardly and downwardly in accordance with the tension in the metallic strip 10 and this upward and downward movement causes the arm 78 to operate a control means for in turn controlling the variable speed drive 67 and, hence, the speed of rotation of the take-up reel 46. In this way, the metallic strip 10 is provided with the desired tension as it is coiled at 45 on the take-up reel 46.

As shown in FIGS. 2, 3 and 2B, 3B, each milling unit 1, 2, 3, 4, 5 and 6 includes a base 81 carried by the tables 20 and 21, and a frame 83 carried by the base 81 for carrying an electric motor 84 for rotating a cutter 85, the cutter 85 being above the metallic strip 10 being milled thereby. Each milling unit also includes an adjustable support 80 carried by the base below the metallic strip 10.

The adjustable support 80 is shown in more detail in FIGS. 4, 5 and 6, the adjustable support being generally designated at 80 in these figures. The adjustable support includes a base plate 87 carried by the base 81 and it is provided with a lower slide wear plate 88. A lower slide 89 is slidably mounted on the wear plate 88 and it is provided with a pair of dovetail surfaces 90. A pair of gibbs 91 are secured to the base plate 87, one of the gibbs 91 engaging directly one of the dovetail surfaces 90 and the other gibb 91 having a gibb insert between it and the other dovetail surface 90. The gibbs 91 guide the lower slide 89 for longitudinal movement. When the lower slide 89 is properly positioned, a screw 93 operated by a knob 94 extending through one of the gibbs 91 presses the gibb insert 92 against the lower slide 89 for locking the same in place. To assure complete locking the gibb 91 is also provided with locking screws 95 which also engage the gibb insert 92. In this way, the lower slide 89 may be locked in desired position. A block 98 carried by the base plate 87 screw threadedly receives a screw 97 having ratchet handle 101 for rotating the same. The screw 97 extends into a cavity in the lower slide 89 and is provided with a collar 99 w hich is held in the cavity by a plate 100. Thus, when the locking device 94 is released, rotation of the screw 97 by the ratchet handle 101 provides longitudinal movement to the lower slide 89. The base plate 87 also carries a block 102 adjacent to other end of the lower slide 89.

The upper surface of the lower slide 89 is slanted and is provided with a dovetail piece 104 having dovetail surfaces 105. An upper slide 106 is provided with matching dovetail surfaces for engaging the dovetail surfaces 105 of the dovetail piece 104. A gibb piece 107 is interposed between the upper slide 106 and one side of the dovetail piece 104. A screw 108 having a knob 109 extends through a portion of the upper slide 106 and engages the gibb piece 107 for pressing the same against the dovetail piece 104 for locking the lower slide 89 and the upper slide 106 together. To assure firm and accurate locking, additional screws 110 are prvoided for also engaging and pressing the gibb piece 107 against the dovetail piece 104. Longitudinal movement of the upper slide 106 is prevented by the end blocks 98 and 102. When the screw 108 is released and the bottom slide 89 is longitudinally moved, the upper slide will be adjusted upwardly and downwardly and when the proper adjusted position is obtained, then the screw 108 is tightened. To eliminate any possible forward or backward movement the end block 102 is provided with a screw 111 for holding the assembly tightly against the other end block 98.

A guide and wear plate holder 113 is suitably secured to the top of the upper slide 106, this holder 113 having longitudinally arranged ribs. The holder 113 carries a rear guide rail 114, a wear plate 115 which is held in place by clamp members 116 and a front guide rail 117, these rails and clamps being suitably secured in place on the holder 113. A pair of pins 118 engage the front guide rail 117 and their outer ends are engaged by clamps 17 which press the rods 118 inwardly by means of spring washers 120 pressed against the clamps by screws 121. In this way, the guide rails 114 and 117 and the wear plate 115 therebetween are firmly and accurately secured in place in the holder 113. The upper surface of the wear plate 115 is depressed below the upper surfaces of the guide rails 114 and 117 for the purpose of guiding the metallic strip and firmly backing the same as it is being milled by the cutter 85.

A pair of hold down clamps 123 arranged above the guide rails 114 and 117 and the wear plate clamps 116 is held in place by nuts 124 on studs 125 and by spring washers 126 pressed against the hold down clamps 123 by means of screws 127. The under surfaces of the hold down clamps 123 are proivded with pieces 128 of nylon or the like. These hold down clamps with their nylon surfaces positively hold the metallic strip 10 against the wear plate 115 as the upper surface of the metallic strip is being milled by the cutter 85.

The arrangement shown in FIGS. 4, 5 and 6 is for milling the contours on the side 7 of the metallic strip 10 as the metallic strip is being advanced along the path 29. FIGS. 7 and 8 illustrate the construction of the adjustable support 80 for supporting the metallic strip 10 in the path 35 as it is having its side 8 milled by the cutters. In this connection, the guide rails 114 and 117, the wear plate 115 and the wear plate clamps 116 are maintained in the appropriate position by pins 130 and 131 which in turn are positioned by clamps 119 which are spring biased by the springs 120 and screws 121.

The deburring fixtures 11, 12, 13, 14 and 15 are carried by bases 136 and the construction of these deburring devices is illustrated in more detail in FIGS. 1 to 12. Here, each deburring fixture which is generally designated at 135 includes a base plate 137 secured to the base 136. A pair of guide rails 138 and 139 are secured to the base plate 137. An intermediate guide plate 140 holds a wear plate 141 against the guide rail 138. The guide plate 140 is held against the base plate 137 by hold down plates 142 secured to the rails 138 and 139. The fixture is also provided with a pair of end plates 143 suitably secured to the base plate 137. A pair of screws 144 extending through the guide rail 139 engage the guide plate 140 for holding the same tightly against the guide rail 138. The metallic strip 10 to be deburred moves along the wear plate 141 between the guide rail 138 and the guide plate 140 underneath the hold down plates 142. A spring strip clamp 145 also operates to hold the metallic strip 10 down against the wear plate 141.

The deburring fixture also includes a collar 147 secured to the base plate 137 which in turn carries a post 148 upon which is slidably mounted a bracket 149, rotation of the bracket 149 with respect to the post 148 being prevented by a key carried by the bracket 149 extending into a key slot 150 in the post 148. The top of the post 148 carries a bracket 151 which in turn journals for rotation a screw 152 extending into a screw threaded hole in the bracket 149. The screw 152 is rotated by a knob 153 and as the knob 153 is rotated, the bracket 149 is adjusted upwardly and downwardly on the post 148. The bracket 149 is provided with a hole for receiving a horizontal arm 154, the arm 154 being secured in place on the bracket and being secured against rotation on the bracket by set screws extending through the bracket and engaging a flat on the arm 154. A tool holder 155 is slidably mounted on the arm 154 and it is held against rotation with respect to the arm 154 by a key extending into a key slot 156 in the arm 154. The end of the arm 154 is provided with a bracket 154 which rotatably mounts a screw 158 received in a screw threaded hole in the tool holder 155, the screw being rotated by a knob 159. Thus, by rotating the knob 159 the tool holder 155 may be horizontally adjusted along the horizontal arm 154. The tool holder carries a tool 160 which is arranged above the metallic strip so as to remove burrs from the milled metallic strip.

FIGS. 13 to 17 are enlarged views showing the manner in which the deburring is accomplished. FIG. 13 illustrating the deburring action accomplished by the deburring fixture 11, FIG. 14 illustrating the deburring action accomplished by the deburring fixture 12, FIG. 15 illustrating the deburring action accomplished by the deburring fixture 15, FIG. 16 illustrating the deburring action accomplished by the deburring fixture 14 and FIG. 17 illustrating the deburring action accomplished by the deburring fixture 13. In FIG. 13 the metallic strip 10 is supported by the wear plate 141 between the guide rail 138 and the guide plate 140. The deburring tool 160 is a straight tool and removes burrs from cuts 1 and 2 illustrated in FIG. 1. In FIG. 14 which represents the deburring fixture 12, the tool 160 has a reduced portion 161 for removing burrs from cut 1 as illustrated in FIG. 1. The deburring fixtures illustrated in FIGS. 15, 16 and 17 have to do with removing burrs resulting from milling side 8 of the metallic strip 10. In this connection, the wear plate 141 is contoured as illustrated at 162 for firmly supporting the metallic strip along cut 2 as illustrated in FIG. 1. Here, the wear plate 141' is also provided with a slot 163 for receiving a portion 166 of the tool 160. Here, also, the guide plate 140' is provided with a lip 164 and with a slot 165 for accommodating the tool 160. The tool portion 166 and the lip 164 operate to remove the burr from the underside of the sharp edge which was formed by cut 6 as illustrated in FIG. 1. In FIG. 16 which is representative of the deburring fixture 14, the wear plate 141' is also contoured at 162 for properly supporting the metallic strip 10. Here, the lip 164 on the guide plate 140' firmly holds the metallic strip 10 and the straight tool 160 operates to remove the burr from cuts 3 and 5 as illustrated in FIG. 1. In FIG. 17 which is representative of the deburring fixture 13, the wear plate 141' is also contoured to properly support the metallic strip 10 and the lip 164 also holds and guides the metallic strip 10. Here, the tool 160 is provided with a pointed surface 167 for removing the burr from cut 5 as illustrated in FIG. 1.

While for purposes of illustration, one form of this invention has been disclosed, other forms thereof may become apparent to those skilled in the art upon reference to this disclosure and, therefore, this invention is to be limited only by the scope of the appended claims.

We claim:

1. A milling machine for milling contours on opposite sides of a metallic strip comprising, a supply reel adjacent one end of the machine carrying a coil of the metallic strip for paying out the metallic strip along one path extending lengthwise of the machine with one side of the metallic strip facing upwardly, a reversing roll adjacent the other end of the machine which is coursed by the metallic strip for reversing the metallic strip and feeding it along another adjacent path extending lengthwise of the machine with the other side of the metallic strip facing upwardly, a take-up reel adjacent said one end of the machine for coiling thereon the metallic strip from said other adjacent path, at least one milling unit adjacent said one end of the machine having a rotatable cutter above said one path for milling said one side of the metallic strip as it is advanced along said one path, at least one other milling unit adjacent said other end of the machine having a rotatable cutter above said other adjacent path for milling said other side of the metallic strip as it is advanced along said other adjacent path, and an inspection station adjacent the center of the machine including a comparator above said path and said other adjacent path for inspecting the upwardly facing milled sides of the metallic strip passing thereby in said paths.

2. A milling machine as defined in claim 1 including, at least one deburring fixture between said at least one milling unit and said inspection station having a tool above said one path for deburring the upwardly facing milled side of the metallic strip passing thereby in said one path, and at least one other deburring fixture between said at least one other milling unit and said inspection station having a tool above said other adjacent path for deburring the upwardly facing milled side of the metallic strip passing thereby in said other adjacent path.

3. A milling machine as defined in claim 1 including, first driving means between said inspection station and said other end of the machine having driving rolls engaging the metallic strip in said one path and variable speed drive means for said driving rolls, first control means at said inspection station including a console for controlling the speed of operation of said variable speed drive means, second driving means between said inspection station and said one end of the machine having driving rolls engaging the metallic strip in said other adjacent path and variable speed drive means for said driving rolls, and second control means including means responsive to the tension of the metallic strip in said other adjacent path between said reversing roll and said at least one other milling unit for controlling the speed of operation of said variable speed drive means of said second driving means.

4. A milling machine as defined in claim 3 including, third driving means including variable speed drive means for driving said take-up reel, and third control means including means responsive to the tension of the metallic strip in said other adjacent path as the metallic strip approaches said take-up reel for controlling the speed of operation of said variable speed drive means of said third driving means.

5. A milling machine as defined in claim 1 wherein each said milling unit comprises, a base carried by the machine for supporting the rotatable cutter above the metallic strip and an adjustable support carried by the base below the metallic strip and including a wear plate carried by the adjustable support for engaging the underside of the metallic strip, guide rails carried by the adjustable support on opposite sides of the wear plate for guiding the metallic strip along the wear plate, said wear plate and guide rails being selectively positioned on the adjustable support so as to align said wear plate with said one path or said other adjacent path of the metallic strip, and means for adjustably raising and lowering the adjustable support and the wear plate carried thereby with respect to the rotatable cutter.

6. A milling machine as defined in claim 5 wherein the wear plate of said at least one other milling unit is contoured to accommodate the milled underside of the metallic strip which was previously milled by said at least one milling unit.

7. A milling machine as defined in claim 5 including hold down clamps for holding the metallic strip against the wear plate.

8. A milling machine as defined in claim 7 wherein said hold down clamps have a surface of Teflon or the like engaging the metallic strip.

9. A milling machine as defined in claim 2 wherein each said deburring fixture comprises, a base carried by the machine, a wear plate carried by the base below the metallic strip, guide rails carried by the base on opposite sides of the wear plate for guiding the metallic strip along the wear plate, said wear plate and guide rails being selectively positioned on the base so as to align said wear plate with said one path or said other adjacent path of the metallic strip, a post carried by the base, an arm horizontally carried by the post above the metallic strip, a tool holder carried by the arm above the metallic strip, and a deburring tool carried by the tool holder above the metallic strip for deburring the metallic strip, at least some of the connections between the post, arm, tool holder and deburring tool being adjustable for appropriately positioning the deburring tool with respect to the metallic strip and the wear plate engaging the same.

10. A milling machine as defined in claim 9 wherein the wear plate of said at least one other deburring fixture is contoured to accommodate the milled and deburred underside of the metallic strip which was previously milled and deburred by said at least one milling unit and said at least one deburring fixture.

*11. A milling machine for milling contours on opposite sides of a metallic strip comprising a supply reel adjacent one end of the machine carrying a coil of the metallic strip for paying out the metallic strip along a first path extending lengthwise of the machine with one side of the metallic strip facing upwardly, a reversing roll adjacent the other end of the machine which is coursed by the metallic strip for reversing the metallic strip and feeding it along a second path adjacent the first path and extending lengthwise of the machine with the other side of the metallic strip facing upwardly, a take-up reel adjacent said one end of the machine for coiling thereon the metallic strip from the second path, at least one milling unit adjacent said one end of the machine having a rotatable cutter above the first path for milling the one side of the metallic strip as it is advanced along the first path, at least one other milling unit adjacent said other end of the machine having a rotatable cutter above the second path for milling the other side of the metallic strip as it is advanced along the second path.*

References Cited

The following references, cited by the Examiner, are of record in the patented file of this patent or the original patent.

UNITED STATES PATENTS

| | | | |
|---|---|---|---|
| 2,327,531 | 8/1943 | Koch | 90—21 A |

FOREIGN PATENTS

| | | | |
|---|---|---|---|
| 584,084 | 9/1933 | Germany | 90—21 C |
| 1,469,427 | 1/1967 | France | 90—21 A |

GIL WEIDENFELD, Primary Examiner

U.S. Cl. X.R.

90—11 R